United States Patent
Loder et al.

(10) Patent No.: US 11,121,542 B2
(45) Date of Patent: Sep. 14, 2021

(54) PROTECTION COORDINATION TECHNIQUE FOR POWER CONVERTERS

(71) Applicant: Rolls-Royce North American Technologies, Inc., Indianapolis, IN (US)

(72) Inventors: David Loder, Carmel, IN (US); David Russell Trawick, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 260 days.

(21) Appl. No.: 16/174,076

(22) Filed: Oct. 29, 2018

(65) Prior Publication Data

US 2020/0136370 A1    Apr. 30, 2020

(51) Int. Cl.
| | | |
|---|---|---|
| *H02H 7/12* | (2006.01) | |
| *H02H 1/00* | (2006.01) | |
| *H02J 3/36* | (2006.01) | |
| *H02M 7/217* | (2006.01) | |

(52) U.S. Cl.
CPC ........ *H02H 7/1216* (2013.01); *H02H 1/0007* (2013.01); *H02J 3/36* (2013.01); *H02M 7/217* (2013.01)

(58) Field of Classification Search
CPC ...... H02H 1/0007; H02H 3/023; H02H 3/025; H02H 3/08; H02H 3/20; H02H 7/1227; H02H 7/1257; H02H 7/1216; H02H 7/268; H02H 9/02; H02H 9/041; H02J 3/36; H02M 1/32; H02M 7/217
USPC ......................................................... 361/18
See application file for complete search history.

(56) References Cited

U.S. PATENT DOCUMENTS

| | | | |
|---|---|---|---|
| 4,896,242 A | 1/1990 | Neff | |
| 8,295,022 B2 | 10/2012 | Tang et al. | |
| 9,184,003 B2 | 11/2015 | Crane | |
| 9,780,556 B2 | 10/2017 | Zhang et al. | |
| 2012/0299393 A1 | 11/2012 | Hafner et al. | |
| 2013/0026825 A1 | 1/2013 | Savage et al. | |
| 2013/0193766 A1 | 8/2013 | Irwin et al. | |
| 2014/0177298 A1* | 6/2014 | Reymond ............... | H02M 1/32 |
| | | | 363/56.03 |
| 2014/0328093 A1 | 11/2014 | Zhang et al. | |
| 2014/0355158 A1 | 12/2014 | Metzner et al. | |

(Continued)

FOREIGN PATENT DOCUMENTS

EP        3107172 A1    12/2016

OTHER PUBLICATIONS

Peng et al. "A Fast Mechanical Switch for Medium-Voltage Hybrid DC and AC Circuit Breakers", Jul./Aug. 2016, IEEE Transactions on Industry Applications, vol. 52, No. 4 (Year: 2016).*

(Continued)

*Primary Examiner* — Kevin J Comber
(74) *Attorney, Agent, or Firm* — Shumaker & Sieffert, P.A.

(57) ABSTRACT

A control unit of an electrical system is described. The control unit causes some of the switches in a power converter of the electrical system to not be shut down and not conducting upon detection of a fault current caused by a line-to-line fault. Instead, the control unit causes at least one of the switches to be switched-on and conducting to allow the some of the fault current to flow through the at least one switch, before activating a protection device that creates an open circuit and breaks the fault.

22 Claims, 5 Drawing Sheets

(56) References Cited

U.S. PATENT DOCUMENTS

| | | | |
|---|---|---|---|
| 2014/0359190 A1 | 12/2014 | Metzner et al. | |
| 2017/0163170 A1* | 6/2017 | Tahata | H02M 7/483 |
| 2018/0076735 A1* | 3/2018 | Bakran | H02H 9/02 |
| 2018/0166972 A1 | 6/2018 | Qi et al. | |

OTHER PUBLICATIONS

Extended European Search Report from counterpart EP Application No. 19202146.7 dated Apr. 3, 2020, 8 pgs.

Brombach et al., "Optimizing the Weight of an Aircraft Power Supply System through a +/− 270 VDC Main Voltage", http://pe.org.pl/articles/2012/1a/9.pdf, 2012, 4 pgs., Applicant points out, in accordance with MPEP 609.04(a), that the year of publication, 2012, is sufficiently earlier than the effective U.S. filing date, 2018, so that the particular month of publication is not in issue.

Kumar, "Fast Fault Clearance and Automatic Recovery of Power Transmission in MMC-Based HVDC Systems", International Journal of Latest Engineering Research and Applications (IJLERA) ISSN: 2455-7137, vol. 2, Issue 4, Apr. 2017, pp. 78-92, 15 pgs.

Ildstad, "Challenges arising from use of HVDC", Nordic Insulation Symposium, Jun. 2013, 4 pgs.

Setlak et al., "Analysis and Simulation of Advanced Technological Solutions in the Field of Power High-Voltage Direct Current (HVDC) of Modern Aircraft in Line with the Trend of More Electric Aircraft (MEA)" Technical Transactions: Electrical Engineering, 3-E/2016, 12 pgs., Applicant points out, in accordance with MPEP 609.04(a), that the year of publication, 2016, is sufficiently earlier than the effective U.S. filing date, 2018, so that the particular month of publication is not in issue.

Hernandez et al., "A New Methodology for Aircraft HVDC Power Systems design" IEEE International Conference on Industrial Technology (ICIT2009),Feb. 2009, 6 pgs.

Brown, "Metal Oxide Varistor Degradation", https://iaeimagazine.org/magazine/2004/03/16/metal-oxide-varistor-degradation/, Mar. 16, 2004, 14 pgs.

Varistor and the Metal Oxide Varistor Tutorial, https://www.electronics-tutorials.ws/resistor/varistor.html, Aug. 22, 2018, 11 pgs.

Response to Extended European Search Report from counterpart EP Application No. 19202146.7 dated Apr. 3, 2020, filed Oct. 16, 2020, 15 pgs.

Examination Report from counterpart European Application No. 19202146.7, dated May 7, 2021, 3 pp.

* cited by examiner

FIG. 2A

PROTECTION COORDINATION TECHNIQUE FOR POWER CONVERTERS

TECHNICAL FIELD

The disclosure relates to fault protection for DC power converters.

BACKGROUND

Power converters, such as power converters used in high voltage direct current (HVDC) grids (e.g., found in some hybrid electric aircraft and other applications) may include some form of fault protection, for example, to protect: the power converters, the power grid, or the equipment supplied by the grid, from overvoltage or overcurrent conditions caused by faults. For example, some fault protection systems may cause a power converter to open all of its internal power switches (e.g. insulated gate bipolar transistors (IGBT) or power metal-oxide-semiconductor field-effect transistors (MOSFET)) to cause an open circuit condition within the power converter itself, to prevent damage from a detected fault. However, this may not adequately protect against all faults, specifically line-line faults on the DC network. Therefore, dedicated DC circuit breakers may also be included in the circuit, such as solid state circuit breakers (SSCB) or hybrid circuit breaker (HCB)s, that are meant to trip i.e. open, during a fault and cause an open circuit condition to break a detected fault. Dedicated fault protection devices, which may be capable of detecting a fault and absorbing the fault energy, may be undesirable in some applications because dedicated fault protection devices may add weight, cost, and complexity to a system.

SUMMARY

In general, the disclosure is directed to techniques and systems for dynamically enabling a power converter (e.g., found in a vehicle system, power grid, or other application) to assist other protection devices in protecting a circuit during a fault condition. In particular, the described techniques may be particularly useful to protect a circuit from line-to-line faults that may occur between two transmission lines of a DC power grid. Unlike other fault protection responses that might command the opening of all internal switches of the power converter in an attempt to isolate the fault, an example power converter may instead dissipate energy built up during a fault by closing at least one internal switch, rather than opening all the internal switches, when a line-to-line fault occurs. By controlling an example power converter in this way, any switch of the power converter that operates in a switched-on or closed state, may dissipate a portion of a fault current that has built up in a circuit, during a fault. The example power converter may dissipate some of the fault current in this way, for example, before activating a protection device (e.g., a breaker) that breaks the fault. With at least some of a fault current being dissipated by the example power converter, an affected circuit can rely on less robust protection devices (e.g., breakers) down the line from the example power converter, since the protection devices no longer need to be able to handle an entire fault current during activation. This technique may also enable mechanical contactor solutions for breaking faults at higher voltage and higher currents as well as extend the life of existing mechanical contactor solutions. The techniques of this disclosure are applicable to both alternating current (AC) to DC power converters or DC/DC power converters.

In one example, the disclosure is directed to a method comprising: receiving, by a control unit of a power system, an indication of a fault condition at the power system; in response to receiving the indication, verifying, by the control unit, that at least one switch of a power converter of the power system is conducting current; and after verifying that the at least one switch is conducting current, enabling, by the control unit, a protection device that prevents the current from flowing out of the power converter.

In another example, the disclosure is directed to a control unit of an electrical system that includes a power converter comprising at least one switch configured to convert input power to an output power to a load, wherein the control unit is operatively coupled to the power converter and is configured to: receive an indication of a fault condition within the electrical system, wherein the fault condition causes a fault current in the power converter; in response to receiving the indication, verify that the at least one switch is conducting current; and after verifying that the at least one switch is conducting current, enable a protection device, wherein enabling the protection device prevents the fault current from flowing from the power converter and to the load.

In another example, the disclosure is directed to a system comprising: a high voltage direct current (HVDC) grid; a power source; a protection device; a power converter configured to supply DC power to the HVDC grid, the power converter comprising: at least one switch configured to convert input power from the power source into DC power; and a control unit operatively coupled to the at least one switch, the control unit configured to: receive an indication of a fault condition within the system, wherein the fault condition causes a fault current in the power converter; in response to receiving the indication, verify that the at least one switch is conducting current, such that at least a portion of the fault current flows through the at least one switch; after verifying that the at least one switch is conducting current, enable the protection device, wherein enabling the protection device prevents the fault current from flowing from the power converter and to the HVDC grid.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 2A is a block diagram illustrating an example electrical system with an AC/DC power converter configured to implement fault protection, in accordance with techniques of this disclosure.

DETAILED DESCRIPTION

In general, the disclosure is directed to techniques and systems for dynamically enabling a power converter (e.g., found in a vehicle system, power grid, or other application) to assist other protection devices in protecting a circuit during a fault condition. Rather than isolate a power converter during a fault, an example electrical system relies on the power converter to aid in handling the fault. That is, rather than arbitrarily opening all the switches of a power converter to isolate the power converter and other components during a line-to-line fault, the example electrical system causes one or more switches of the power converter to be left closed to allow at least a portion of a fault current to exit the electrical system through the one or more switches. The example electrical system may keep the one or more switches closed briefly, and before activating a primary protection device (e.g., a circuit breaker) that can finally break the fault. In other words, the example electrical system may utilize an existing power converter to provide additional fault protection capability thereby enabling the example electrical system to rely on less robust primary fault protection devices than other electrical systems that rely on primary fault protection devices alone.

Figure 1:
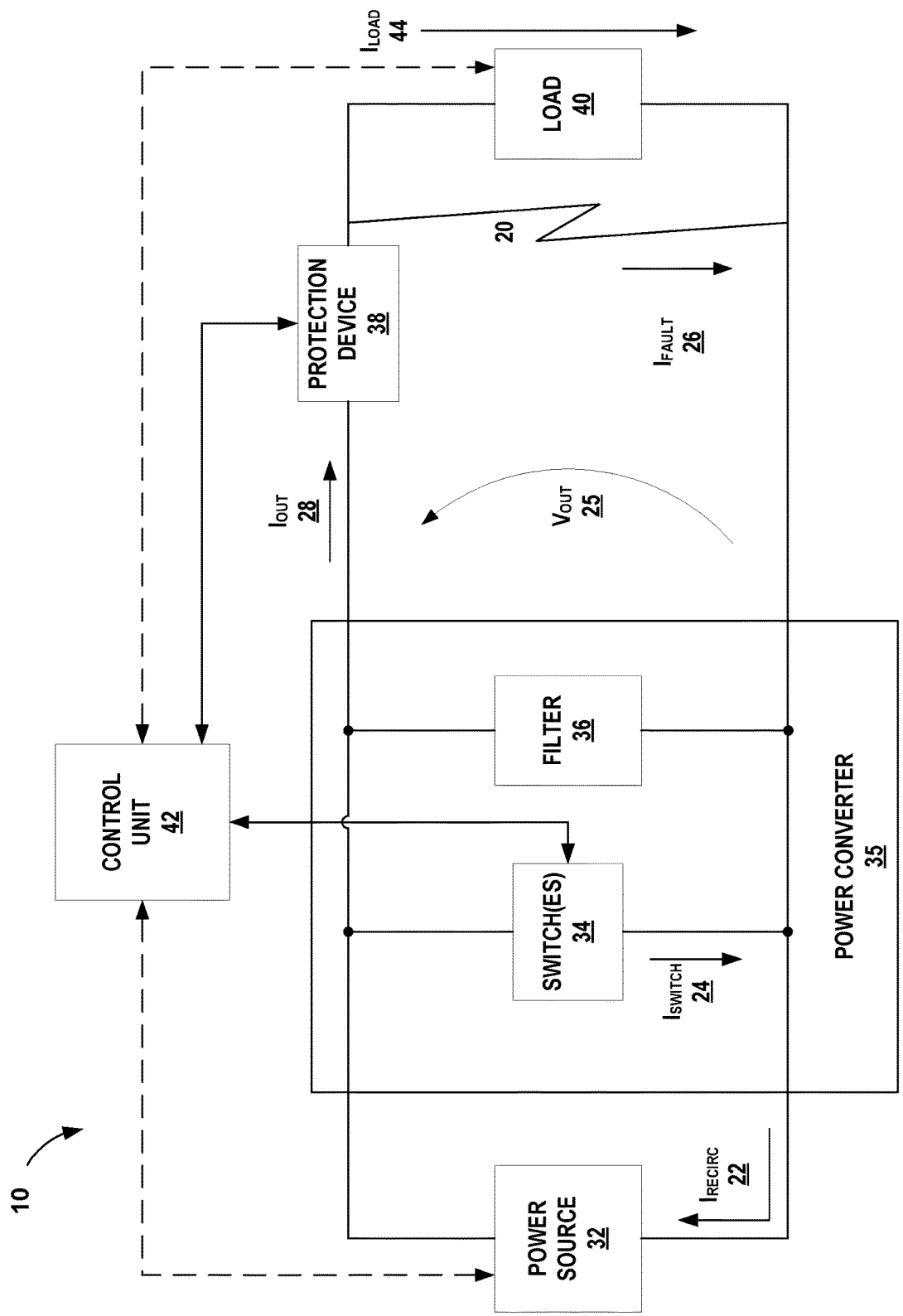
FIG. 1 is a block diagram illustrating an example electrical system configured to implement fault protection, in accordance with techniques of this disclosure.

FIG. 1 is a block diagram illustrating an example electrical system configured to implement fault protection, in accordance with techniques of this disclosure. In some examples, electrical system 10 (referred to simply as "system 10") may form part of a manned or unmanned vehicle system, such as an electrical system of an automobile or aircraft. In other examples, system 10 may be part of a high voltage (HV) power grid, such as a HVDC power grid, which may part of a vehicle system. In some examples, the meaning of the term "high voltage" may vary from industry to industry. For example, "high voltage" in the aerospace industry may include systems that operate above 540V. Whereas for terrestrial power grids, low voltage dc (LVDC) may be defined as voltage less than 1000V (i.e. one kV), while medium voltage DC (MVDC) may be considered for systems that operate with voltages between 1 kV and 100 kV. The techniques of this disclosure may apply to systems considered HVDC, LVDC and MVDC. This disclosure uses the term HVDC systems to simplify the explanation.

Electrical system 10 includes: power source 32, protection device 38, load 40, control unit 42 and power converter 35, which may include switches 34, filter 36. In some examples, system 10 may be subject to a fault, such as line-to-line fault 20. Fault 20 may cause fault current, $I_{FAULT}$ 26 to bypass load 40 and at least partially reduce the load current, LOAD 44.

Power source 32 supplies power to electrical system 10 and load 40, e.g. $I_{OUT}$ 28. Power source 32 may be an AC or DC power source. Examples of power source 32 as an AC power source may include an AC generator, such as powered by a gas turbine or other motor. An AC generator may be a single phase or multiple phase generator, such as a three-phase generator. Examples of power source 32 as a DC power source may include a fuel cell, a battery or a DC/DC converter.

Load 40 may include any type of load that uses DC power. In some examples, load 40 may include an HVDC power grid, which supplies a variety of other loads. Some examples of other loads include equipment such as avionics, e.g. weather radar, navigation equipment, and communication equipment, lighting, food preparation appliances, pumps, and similar equipment. The equipment may include, or be served by, other power converters to change the voltage on the HVDC grid to the voltage type and level used by the equipment. For example, a compartment light may run on 12 V DC and the output of power converter 35 may supply 200 V DC. The compartment light may include a DC/DC power converter to reduce the 200 V DC to the 12 V DC needed to run the compartment light.

Protection device 38 is a primary protection device of electrical system 10. Protection device 38 protects electrical system 10 from faults, such as fault 20, by breaking fault current ($I_{FAULT}$) 26. Protection device 38 may include any type of device configured to disconnect a power supply from a load in the event of an overvoltage, overcurrent or other types of faults. Some examples of protection devices include a fuse, a solid state circuit breakers (SSCB), hybrid circuit breaker (HCB)s and fast mechanical disconnect (FMD). Protection device 38 is configured to create an open circuit to break fault current $I_{FAULT}$ 26 and prevent fault current $I_{FAULT}$ 26 from damaging electrical system 10.

Control unit 42 controls the components of electrical system 10 to cause electrical system 10 to distribute electrical power to load 4. Control unit 42 may send and receive signals to and from power converter 35, to protection device 38, and in some cases, power source 32 and load 40. In some examples, load 40 may send signals to control unit 42 to increase or decrease the power output to load 40. Control unit 42 may located anywhere such that control unit 42 can communicate with the components of electrical system 10. For example, control unit 42 may be integrated with power converter 35, part of power source 32, or part of other circuitry that controls and monitors an aircraft or other vehicle in which electrical system 10 is installed.

Control unit 42 may include one or more processors and a memory. Examples of processor in control unit 42 may include any one or more of a microcontroller (MCU), e.g. a computer on a single integrated circuit containing a processor core, memory, and programmable input/output peripherals, a microprocessor (μP), e.g. a central processing unit (CPU) on a single integrated circuit (IC), a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry.

Control unit 42 may be operatively connected to switches 34 and protection device 38. Control unit 42 may receive signals from switches 34 and protection device 38 as well as send control signals to switches 34 and protection device 38. For example, control unit 42 may receive an indication of the state of the one or more switches in switches 34, such as whether a switch is open, and not conducting current, or a switch is closed, and conducting current. Control unit 42 may also monitor the output voltage ($V_{OUT}$) 25 and current ($I_{OUT}$) 28 from power converter 35 via voltage and current sensors (not shown in FIG. 1).

Power converter 35 converts power supplied by power source 32 according to the requirements of load 40. Examples of power converter 35 include an AC/DC converter, a DC/DC converter, or any other type of power converter with one or more switches that can be controlled during a fault to dissipate at least a portion of fault current 26.

Power converter 35 may include one or more switches 34 and filter 36. Switches 34 are controlled by control unit 42 to convert input power from power source 32 to an output power that is delivered to load 40. Switches 34 may include one or more pairs of high-side and low-side switches used to convert an AC power from power source 32 to a DC power at a predetermined output voltage and current to be used by load 40. Similarly, in the example of a DC power source, power converter 35 may be a DC/DC power converter such as a buck converter, boost converter, buck-boost converter, or an isolated power converter such as a flyback topology power converter, or any other similar topology, that converts a DC power from power source 32 to a different form of DC power used by load 40. In some examples, switches 34 may include one or more energy absorption devices. Some examples of energy absorption devices may include a metal oxide varistor (MOV) or a transient voltage suppression (TVS) diode.

Filter 36 filters the converted power being output from power converter 35. Filter 36 includes components that when combined with switches 34, convert input power from power source 32 to the desired output voltage and current. In the example where power converter 35 is a DC/DC buck converter, filter circuit 36 may include an inductor, a diode and a capacitor connected between switches 34 and load 40 (not shown in FIG. 1). In other examples of power converter 35, filter circuit 36 may include other components such as a transformer, primary side switch, synchronous rectification switch and other components not shown in FIG. 1.

In operation, control unit 42 may send control signals to protection device 38. Protection device 38 may receive a signal from control unit 42 to enable protection device 38 (e.g., by causing an open circuit), which causes protection device 38 to isolate power converter 35 from load 40 to break a detected fault, such as line-to-line fault 20. Protection device 38 may receive a reset signal from control unit 42 to reconnect power converter 35 to load 40 (e.g., by closing the open circuit). For example, control unit 42 may receive an indication that fault 20 has been cleared and that it is safe to reconnect power converter 35 to load 40. Once fault 20 has been cleared, control unit 42 may send the reset signal to protection device 38 to reconnect power converter 35 to load 40. An FMD may have an advantage over a dedicated fault protection device, such as a SSCB, because an FMD may be less costly and weigh less than an SSCB, or other types of dedicated fault protection device.

In the example of FIG. 1, fault 20 is a line-to-line fault. Fault 20 may be caused by a short circuit in a piece of equipment connected to an HVDC power grid, a fault within power converter 25, a fault in the wiring that supplies the loads in load 40, such as an insulation failure between the power and ground lines, or by some other cause. Fault 20 may result in a fault current, depicted by $I_{FAULT}$ 26. $I_{FAULT}$ 26 may bypass portions of load 40, depending on the location of fault 20. Under normal operating conditions, current from power converter 35 passes through load 40, as indicated by $I_{LOAD}$ 44. By enabling protection device 38 to disconnect power converter 35 from load 40, control unit 42 may stop both $I_{FAULT}$ 26 and $I_{LOAD}$ 44.

In normal operation (i.e., when no fault conditions exist at electrical system 10), electrical system 10 may receive power from power source 32, convert the power to a predetermined voltage and current, and supply the converted power to load 40, via protection device 38. For example, control unit 42 may send control signals to power switches 34 that cause power switches 34 to open and close in a particular way for converting the power being output by power source 32 into power with a voltage, a current, and frequency required by load 40.

However, during a fault condition, control unit 42 may receive an indication of the fault condition. For example, control unit 42 may receive e.g., from a current sensor not shown in FIG. 1, an indication of a current level flowing out of power converter 35. Control unit 42 may determine that the current level represents a fault condition, e.g. fault 20, such as by determining that the current level exceeds a predetermined acceptable current level associated with power converter 35.

In response to detecting fault 20, control unit 42 may reconfigure components of electrical system 10 to prevent fault 20 from damaging electrical system 10. In particular, control unit 42 may control switches 34 to reduce an amount of fault current $I_{FAULT}$ 26 associated with fault condition 20, for instance, prior to enabling protection device 38. In this way, a lower rated protection device 38 may be used, thereby reducing weight, cost, and complexity of electrical system 10.

To prevent damage from fault condition 20, control unit 42 may verify whether at least one switch of switches 34 is closed and conducting current. If none of switches 34 is closed, control unit 42 may send a signal to close at least one switch from switches 34. By closing at least one of switches 34, control unit 42 may cause at least a portion of the fault current to flow through the at least one switch, and recirculate through power source 32 as $I_{RECIRC}$ 22, rather than exit power converter 35 towards protection device 38. In other words, by closing at least one switch and allowing a portion of the fault current to recirculate back through power source 32, control unit 42 reduces the magnitude of the remaining fault current flowing through protection device 38 as $I_{OUT}$ 28. Reducing the amount of remaining fault current that may flow through protection device 38 during a fault event enables electrical system 10 to rely on a lower rated type of protection device 38 that may be less expensive and lower in weight than other protection devices.

In some examples, control unit 42 may control the operation of each switch of switches 34, for example by controlling the gate of an IGBT or a MOSFET. In examples in which control unit 42 controls the operation of the switches in switches 34, control unit 42 may verify the state of each switch, e.g. open or closed, by determining the state of the signal controlling the gate of the switch. In other examples, control unit 42 may receive signals from a current sensor in the path of a switch in switches 34. Some examples of a current sensor for a switch may include a shunt resistor, or a signal from a switch that includes current sensing capability, such as a current sensing MOSFET. Control unit 42 may verify the state of each switch by determining whether current is flowing in the path of the switch. In other examples, power converter 35 may send a signal to control unit 42 about the state of a switch of switches 34. Control unit 42 may verify that at least one switch of switches 34 is conducting a portion of the fault current based on the signal from power converter 35.

After verifying that the at least one switch of switches 34 is conducting a portion of the fault current and allowing the portion of the fault current to recirculate through power source 32, control unit 42 may enable protection device 38. Enabling protection device 38 may disconnect power converter 35 from load 40 and prevent the fault current from flowing from power converter 35. Reducing the magnitude of the remaining fault current through protection device 38 may mean that protection device 38 does not need to be rated to absorb all the energy from the fault current when control unit 42 enables protection device 38, as the fault current is allowed to commutate into the closed switches 34. In some examples, control unit 42 may enable protection device 38 when the portion of the fault current through protection device 38 is less than or equal to a predetermined current.

Once control unit 42 enables protection device 38 and breaks the fault current, control unit 42 may open all the switches in switches 34.

In this manner system 10 may provide advantages over other types of fault protection systems that allow all the fault current to flow through the protection device. In other types of fault protection systems that allow all the fault current to flow through the protection device, the protection device may detect the fault current and disconnect the power supply from the load, but the fault current may be, for example, more than twice the rated current for the power supply. That is, unlike other fault protection systems that relies on a dedicated protection device alone to break the fault current, an example electrical system that uses the described techniques may perform fault protection with less sophisticated, less costly, or lighter fault protection devices.

In other words, the combination of turning on some of the switches in the power converter, and absorbing energy caused by the fault condition may result in allowing a protection device that does not need to be capable of absorbing all the fault energy. Therefore, the protection device may be an FMD rather than a SSCB or HCB. The fault protection control scheme, using an FMD, may provide several advantages over a circuit breaker or other techniques of fault protection. Some advantages may include improved reliability and reduced cost and weight when compared to other techniques. Improved reliability and reduced weight may be desirable in power systems on aircraft, including unmanned aerial systems (UAS) or other vehicles. An FMD may be less complex and weigh less than other types of protection devices. Improved reliability may come from allowing the fault current to commutate into the closed switches before and during the FMD opening, rather than opening the FMD under the full fault current, which forces the FMD to absorb the entire fault energy and may limit the life of the FMD. In some cases, for very high fault current, the FMD may be not be capable of breaking the fault without assistance from the power converter switches.

Figure 2A:
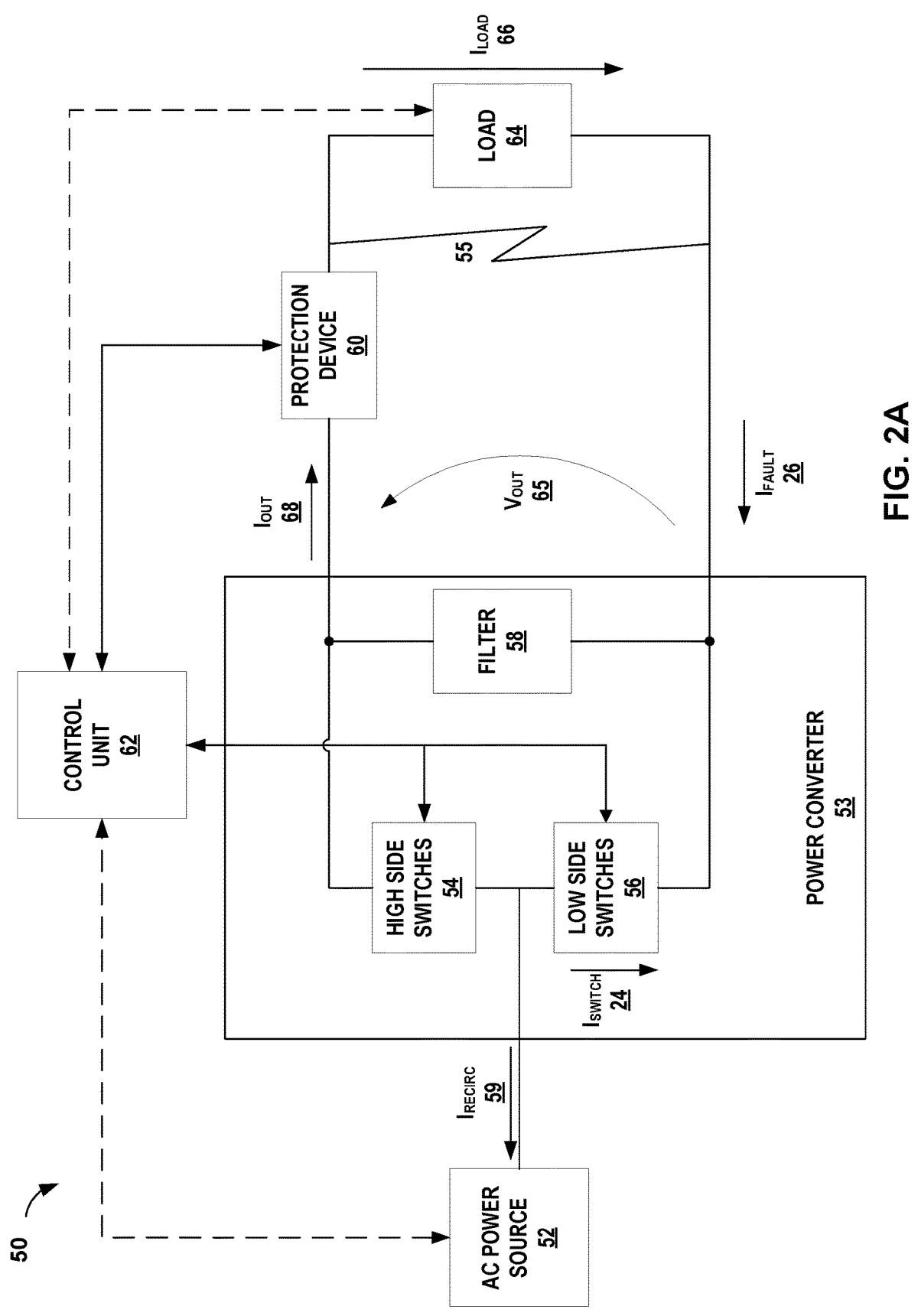

FIG. 2A is a block diagram illustrating an example electrical system with an AC/DC power converter configured to implement fault protection, in accordance with techniques of this disclosure. Electrical system 50 depicted in FIG. 2A is an example of system 10 described above in relation to FIG. 1.

Electrical system 50 (referred to simply as "system 50") includes: power source 52, protection device 60, load 64, control unit 62 and power converter 53, which may include high side switches 54, low side switches 56, and filter 58. Power source 52, protection device 60, load 64, control unit 62, and power converter 53, are, respectively, examples of power source 32, protection device 38, load 40, control unit 42, and power converter 35 of FIG. 1. As such, the characteristics and functions of power source 52, protection device 60, load 64, control unit 62, and power converter 53 may be similar or the same as the characteristics and functions of, respectively, power source 32, protection device 38, load 40, control unit 42, and power converter 35 of FIG. 1.

In some examples, system 50 may be subject to a fault, such as line-to-line fault 55. As with fault 20 described above in relation to FIG. 1, fault 55 may cause fault current, $I_{FAULT}$ 26 to bypass load 64 and at least partially reduce the load current, $I_{LOAD}$ 66.

AC power source 52 supplies power to electrical system 50 and load 64, e.g. $I_{OUT}$ 68. Examples of AC power source 52 include a single phase or multiple phase generator. Similar to load 40 of FIG. 1, load 64 may include any type of load that uses DC power including an HVDC power grid. Protection device 60 is a primary protection device of electrical system 50.

Control unit 62 may control at least some of the components of electrical system 50. Control unit 62 may send and receive signals to and from power converter 53, protection device 60, and in some cases, AC power source 52 and load 64.

Power converter 53 converts power supplied by AC power source 52 according to the requirements of load 64. Power converter 53 is an AC/DC power converter which rectifies and conditions the AC power to a DC output power (i.e. output voltage, $V_{OUT}$ 65, and output current, $I_{OUT}$ 68). In some examples, such as for a vehicle power system, system 50 may supply DC output power at high voltages, e.g. in the hundreds of volts or for low voltages, or a 12 or 24 V system such as for an automobile. For some applications a high voltage system, such as an HVDC grid may have advantages compared to lower voltage systems, such as a 12 volt DC system. For example, higher voltage systems may use a reduced cable weight when compared to low voltage systems. Also, the electrical converter architecture for converters inside individual loads on the HVDC grid may be build lighter when using, for example a +/−270 V DC supply. In the example of an aircraft, a traditional auxiliary power unit (APU) may be replaced by a multifunctional fuel cell system, which may reduce pollution during ground operation.

Some examples of AC/DC power converters, such as power converter 53 depicted in FIG. 2A, may include high side switches 54 and low side switches 56 to rectify and control the output power of power converter 53. In the example of system 50, control unit 62 may include current or voltage sensing capability to monitor the output power of power converter 53 and adjust the switching duty cycle and frequency of high side switches 54 and low side switches 56 to maintain the desired output voltage 65 and output current 68.

Filter 58 includes components that when combined with high side switches 54 and low side switches 56, convert input power from AC power source 52 to the desired DC output voltage and current. Filter 58 may include components arranged to increase the AC output voltage from AC power source 52 to a higher DC output voltage 65. In other examples, filter 58 may include components arranged to decrease the AC output voltage from AC power source 52 to a lower DC output voltage 65.

Similar to described above for system 10 in FIG. 1, during normal operation (i.e., no fault conditions exist at electrical system 50), electrical system 50 may receive power from AC power source 52, convert the AC power to a predetermined DC voltage and current, and supply the converted power to load 64, via protection device 60. Control unit 62 may receive signals from components (not shown in FIG. 2A) that monitor the operation of system 50, such as output current 68 and output voltage 65.

During a fault condition, control unit 62 may receive an indication of the fault condition, e.g. fault 55, based on, for example, detecting an overcurrent condition in system 50. In response, control unit 62 may verify that the at least one switch of high side switches 54 or low side switches 56 are closed and conducting current. Control unit 62 may verify the state of high side switches 54 or low side switches 56 as described above in relation to FIG. 1. When control unit 62 receives an indication of the fault condition one or more switches of high side switches 54 or low side switches 56 may be closed because of normal switching operation. As described above in relation to FIG. 1, closing at least one switch and allowing a portion of fault current 26 to recirculate back through AC power source 52, may reduce the magnitude of the remaining fault current flowing through protection device 60 as $I_{OUT}$ 68. In some examples, control unit 62 may send a signal to close at any remaining switches of low side switches 56 that are not already closed, such that at least a portion of fault current 26 flows through low side switches 56 and recirculates through AC power source 52 as $I_{RECIRC}$ 22. In other examples, control unit 62 may send a signal to close any remaining high side switch 54 and open any low side switches 56 that are not already open. In other examples, control unit 62 may send a signal to close at any remaining switches of both high side switches 54 as well as low side switches 56 that are not already closed to ensure that at least a portion of fault current 26 flows through both high side switches 54 and low side switches 56 and recirculates through AC power source 52. In other examples, control unit 62 may cycle between closing all the high side switches 54 and opening the low side switches 56, then opening all the high side switches 54 and closing the low side switches 56. In this manner, by cycling the fault current between the high side switches 54 and the low side switches 56, control unit 62 may more evenly distribute any thermal load caused by the fault current among all the switches.

After verifying that the selected switches are closed and conducting a portion of fault current 26 and allowing the portion of fault current 26 to recirculate through AC power source 52, control unit 42 may enable protection device 60. Protection device 60 may receive a signal from control unit 62 to enable protection device 60, which causes protection device 60 to isolate power converter 53 from load 64 to break the detected fault. As described above in relation to FIG. 1, the reduced magnitude fault current (e.g. $I_{OUT}$ 68) through protection device 60 may mean that protection device 60 does not need to be rated to absorb all the energy from the fault current when control unit 42 enables protection device 60. Once control unit 62 enables protection device 60 and breaks the fault current, control unit 60 may open all the switches of high side switches 54 and low side switches 56.

Figure 2B:
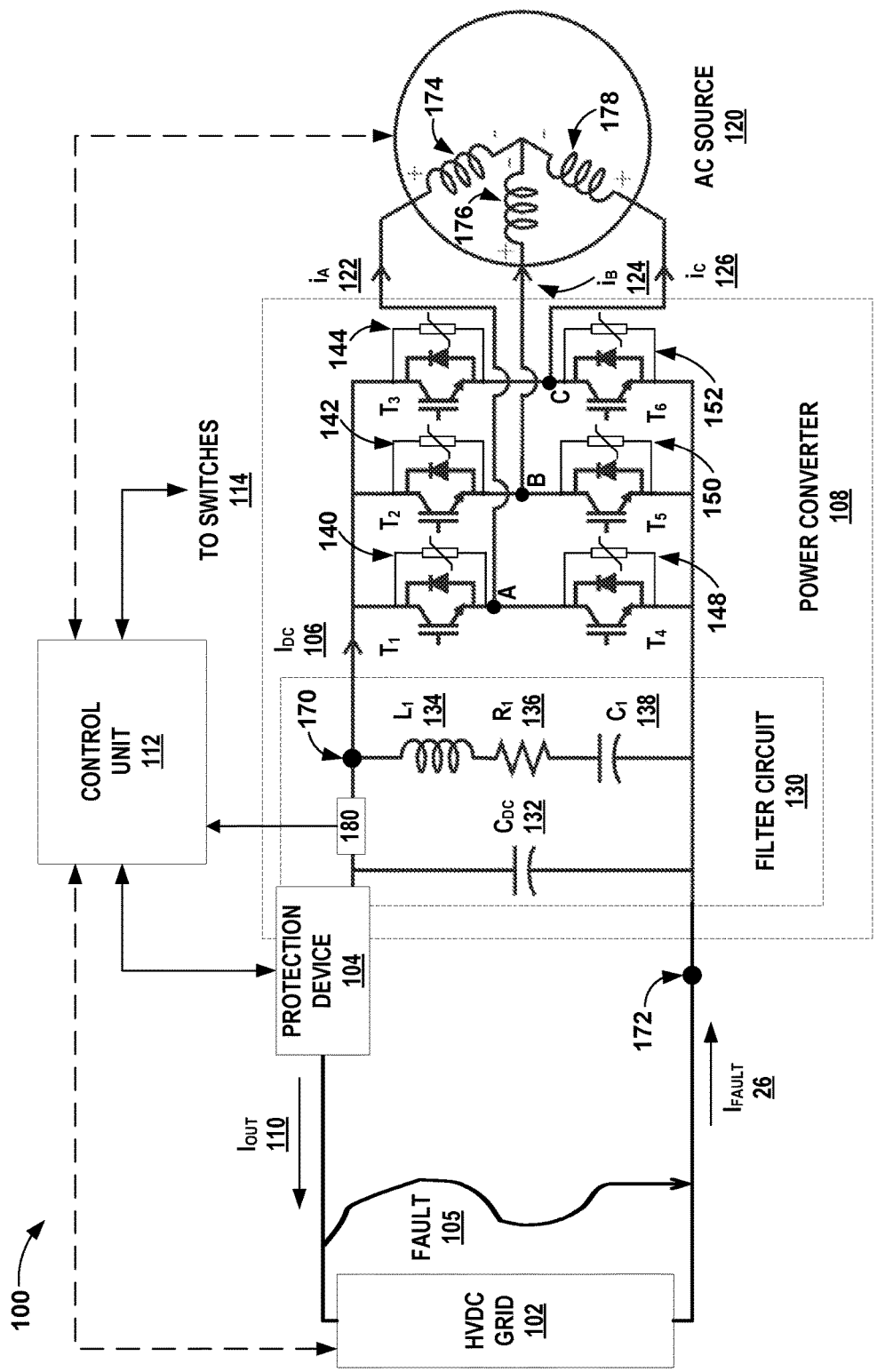
FIG. 2B is a block diagram illustrating an additional example electrical system with an AC/DC power converter configured to implement fault protection, in accordance with techniques of this disclosure.

FIG. 2B is a block diagram illustrating an additional example electrical system with an AC/DC power converter configured to implement fault protection in accordance with techniques of this disclosure. Electrical system 100 (referred to as system 100) operates in a similar manner to systems 10 and 50 described above in relation to FIGS. 1 and 2A. System 100 is just one possible example implementation of an AC/DC power converter circuit supplying a load. In other examples, AC/DC power converters may include different components and configurations and remain within the scope of this disclosure.

System 100 includes: AC power source 120, protection device 104, HVDC grid 102, control unit 112 and power converter 108, which may include switches T1-T6, and filter circuit 130. AC power source 120, protection device 104, HVDC grid 102, control unit 112, and power converter 108, are, respectively, examples of power source 32, protection device 38, load 40, control unit 42, and power converter 35 of FIG. 1. As such, the characteristics and functions of AC power source 120, protection device 104, HVDC grid 102, control unit 112, and power converter 108 may be similar or the same as the characteristics and functions of, respectively, power source 32, protection device 38, load 40, control unit 42, and power converter 35 of FIG. 1.

In some examples, system 10 may be subject to a fault, such as line-to-line fault 20. Fault 20 may cause fault current, $I_{FAULT}$ 26, to bypass load of HVDC grid 102 and at least partially reduce the load current.

AC power source 120 supplies power to electrical system 100 and HVDC grid 102, e.g. $I_{OUT}$ 110. AC power source 120 is a three-phase AC generator and may be powered for example by a gas turbine and in some examples may include an APU. In the example of system 100, AC source 120 is Y-connected with each phase connected to a switch node between pairs of high side and low side switches.

Similar to loads 40 and 64 described above in relation to FIGS. 1 and 2A, HVDC grid 102 receives power from power converter 108 and may supply a variety of other loads connected to HVDC grid 102. HVDC grid 102 may be installed in a vehicle, such as an aircraft, watercraft, or other type of vehicle, as well as installed for other applications that support DC loads.

Protection device 104 protects electrical system 100 from faults, such as fault 105, by breaking fault current ($I_{FAULT}$) 26. In the example of system 100, protection device 38 is an FMD, or similar device configured to disconnect power converter 108 from HVDC grid 102 upon receiving a control signal from control unit 112 that enables protection device 104.

Control unit 112 controls the components of electrical system 100, similar to control units 42 and 62 described above in relation to FIGS. 1 and 2A. Control unit 112 may send and receive signals to and from power converter 108, protection device 104, and in some cases, AC power source 120 and HVDC grid 102. Control unit 112 may send control signals to and receive sensing signals from switches T1-T6 via sense and control lines 114. For example, control unit 112 may control the switching frequency, on-time, duty cycle and other operating characteristics of switches T1-T6 by controlling the voltage applied to the gates of switches T1-T6. Control unit 112 may also sense the status (e.g. on-state or off-state) of each switch, the magnitude of current through each switch, a drain-source voltage ($V_{DS}$), temperature and other sensing signals either directly from switches T1-T6 or from sensing components near switches T1-T6.

Similar to control unit 42 depicted in FIG. 1 and control unit 62 depicted in FIG. 2, control unit 112 may also monitor and control other operating parameters and components of system 100. For example, control unit 112 may monitor the output current ($I_{OUT}$) 110, output voltage and other operating parameters. As one example, power converter 108 may include one or more sensors, such as voltage and current sensor 180, which may send signals to control unit 112. Voltage and current sensor 180 may include a voltage divider and a shunt resistor, or some other techniques of measuring voltage and current. System 100 may also include other sensors, not shown in FIG. 2B. Control unit 112 may also control the operation of protection device 104 as well as receive signals from protection device 104, such as a signal indicating the state of protection device 104 (e.g. closed and conducting current or engaged and not conducting current).

Power converter 108 converts power supplied by AC power source 120 to supply the requirements of HVDC grid 102. Power converter 108 is an example implementation of an AC/DC power converter, similar to power converter 53 described above in relation to FIG. 2A. Like power converter 53, power converter 108 rectifies and conditions the AC power from AC power source 120 to a DC output power. Power converter 108 includes filter circuit 130 and switches T1-T6.

Switches T1-T6 of power converter 108 are depicted as IGBTs, with the gate of each IGBT connected to control unit 112 via sense and control lines 114. For clarity, the connections to the gates of each IGBT are not shown in FIG. 2B. In other examples, switches T1-T6 may also be implemented with any other type of switch, including a MOSFET. The collectors of high side switches T1, T2 and T3 connect to a common node 170 that connects to a first terminal of protection device 104. The emitters of low side switches T4, T5 and T6 connect to a common node 172 that also connects to an output terminal of power converter 108. In some examples node 172 may be considered a ground or reference node. The emitter of high side switch T1 connects to the collector of low side switch T4 as well as to the A winding 174 of AC source 120 at switch node A of the pair formed by high side T1 and low side switch T4. Current $i_A$ 122 flows to A winding 174 from switch node A. Similarly, the emitter of high side switch T2 connects to the collector of low side switch T5 as well as to the B winding 176 of AC source 120 at switch node B of the pair formed by high side T2 and low side switch T5. Current $i_B$ 124 flows to B coil 176 from switch node B. The emitter of high side switch T3 connects to the collector of low side switch T6 as well as to the C winding 178 of AC source 120 at switch node C of the pair formed by high side T3 and low side switch T6. Current $i_C$ 126 flows to C coil 178 from switch node C.

In the example of system 100, each IGBT of switches T1-T6 includes a freewheeling diode connected anti-parallel across each IGBT that allows some reverse current flow and passive rectification during some phases of power converter 108 operation. In example of switches T1-T6 implemented as MOSFETs, the body diode of the MOSFET may perform a similar function.

Each switch T1-T6 also includes an energy absorption device 140-152 connected in parallel across each switch. In the example of system 100, the energy absorption device is an MOV. Specifically, MOV 140 connects in parallel with T1 between node 170 and switch node A, MOV 142 connects in parallel with T2 between node 170 and switch node B, MOV 144 connects in parallel with T3 between node 170 and switch node C, MOV 148 connects in parallel with T4 between node 172 and switch node A, MOV 150 connects in parallel with T5 between node 172 and switch node B, MOV 152 connects in parallel with T6 between node 172 and switch node C.

The resistance of an MOV decreases as voltage magnitude increases. An MOV acts as an open circuit during normal operating voltages and conducts current during voltage transients or an elevation in voltage above the rated maximum continuous operating voltage (MCOV). In other words, the MOV may limit the voltage across each switch. In other examples a TVS diode may be used in place of the MOV depicted in system 100. A TVS diode is a voltage clamping device that operates by shunting excess current when the induced voltage exceeds the avalanche breakdown potential of the TVS diode. The TVS diode is a clamping device, suppressing all overvoltages above its breakdown voltage. The TVS diode may automatically reset when the overvoltage is reduced below a predetermined voltage threshold but may absorbs at least a portion of any transient energy internally.

As with filter 58 described above in relation to FIG. 2A, filter circuit 130 includes components that when combined with high side switches T1-T3 and low side switches T4-T6, convert input power from AC power source 120 to the desired DC output voltage and output current 110. Filter circuit 130 may receive current Inc 106 from switches T1-T6 and condition the current as needed to supply HVDC grid 102. In some examples, as shown in FIG. 2B, filter circuit 130 may include components arranged to increase the AC output voltage from AC power source 120 to a higher DC output voltage. One terminal of inductor L1 134 connects to node 170. The opposite terminal of inductor L1 134 connects to capacitor C1 138 through resistor R1 136. The opposite terminal of capacitor C1 138 connects to node 172. In other words, the series configuration of inductor L1 134, resistor R1 136 and capacitor C1 138 connects node 170 to node 172. Capacitor $C_{DC}$ 132 also connects node 170 to node 172 and provides voltage smoothing for power converter 108.

In operation, system 100 functions the same as system 50 described above in relation to FIG. 2A. That is, during normal (i.e., no fault) operation system 100 may receive power from AC power source 120, convert the AC power to a predetermined DC voltage and current, and supply the converted power to HVDC grid 102, via protection device 104.

During a fault condition, control unit 112 may receive an indication of the fault condition. For example, control unit 112 may receive e.g., from voltage and current sensor 180, an indication of a current level flowing out of power converter 108. Control unit 112 may determine that the current level represents a fault condition, e.g. fault 105, such as by determining that the current level indicated by voltage and current sensor 180 exceeds a predetermined acceptable current level associated with power converter 108.

In response to detecting fault 105, control unit 112 may reconfigure components of electrical system 100 to prevent fault 105 from damaging electrical system 100. In particular, control unit 112 may control switches T1-T6 to reduce an amount of fault current $I_{FAULT}$ 26 associated with fault condition 105, for instance, prior to enabling protection device 104. In this way, a lower rated protection device 104 may be used, thereby reducing weight, cost, and complexity of electrical system 100.

To prevent damage from fault condition 105, control unit 112 may verify whether may verify that the at least one switch of high side switches T1-T3 or low side switches T4-T6 are closed and conducting current. By closing at least one switch, control unit 112 may cause at least a portion of fault current 26 to recirculate back through AC power source 120, i.e. as currents $i_A$ 122, $i_B$ 124, and $i_C$ 126, rather than exit power converter 35 towards protection device 38. In other words, by closing at least one switch and causing some of the fault current to recirculate through AC power source 120, may reduce the magnitude of the remaining fault current flowing through protection device 104 as $I_{OUT}$ 110. As with system 50, control unit 112 may send a signal to close at any remaining switches of low side switches T4-T6 that are not already closed, such that at least a portion of fault current 26 flows through low side switches and recirculates through AC power source 120. In other examples, as described above in relation to FIG. 2A, control unit 112 may instead send a signal to close at any remaining switches of high side switches T1-T3 that are not already closed, such that at least a portion of fault current 26 flows through high side switches and recirculates through AC power source 120. In other examples, control unit 112 may send a signal to control all of switches T1-T6, or cycle between closing high side switches T1-T3 and low side switches T4-T6. Once control unit 112 enables protection device 104 and breaks the fault current, control unit 112 may open all the switches T1-T6 and prevent the switches from conducting any current.

As discussed above, one advantage of using an FMD as a protection device may include reduced weight when compared with other types of protection devices. In the example of system 100 installed on an aircraft, weight savings may have a positive "snowball effect". For example, saving weight in the installed equipment may lead to a possible weight reduction of the aircraft structure and the engine. In other words, by reducing the equipment weight, the structure needed to support the equipment, and the engine power needed to fly the aircraft may also be reduced. That is, a kilogram of equipment weight savings may result in more than a kilogram of weight savings for the entire vehicle, which may result in lower fuel consumption and an improved performance.

Figure 3:
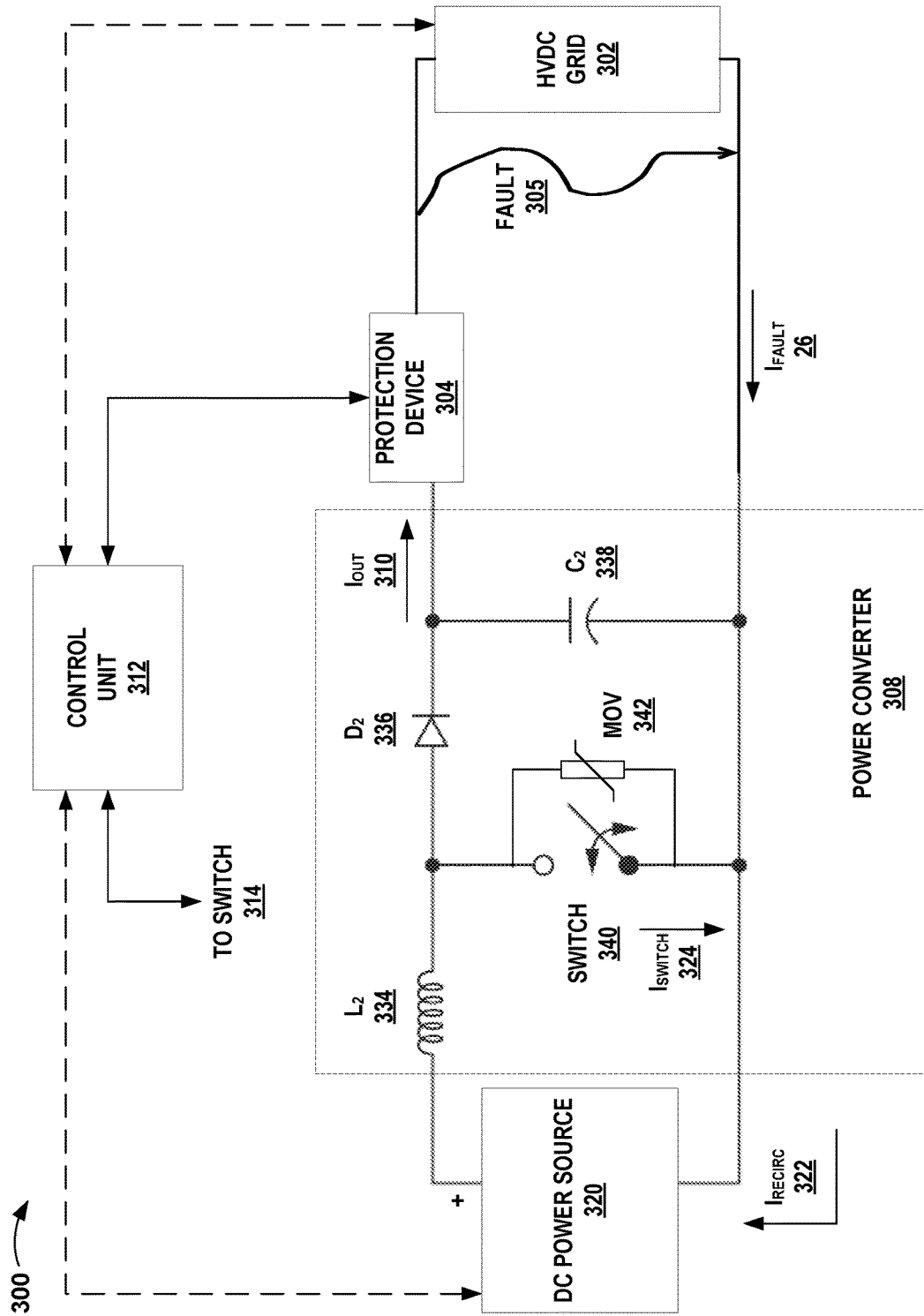
FIG. 3 is a block diagram illustrating an example electrical system with a DC/DC power converter configured to implement fault protection, in accordance with techniques of this disclosure.

FIG. 3 is a block diagram illustrating an example electrical system with a DC/DC power converter configured to implement fault protection, in accordance with techniques of this disclosure. The function and characteristics of system 300 are similar to the function and characteristics of system 10 described above in relation to FIG. 1.

Electrical system 300 includes: DC power source 320, protection device 304, HVDC grid 302, control unit 312 and power converter 308. DC power source 320, protection device 304, HVDC grid 302, control unit 312 and power converter 308, are, respectively, examples of power source 32, protection device 38, load 40, control unit 42, and power converter 35 of FIG. 1. As such, the characteristics and functions of power DC power source 320, protection device 304, HVDC grid 302, control unit 312 and power converter 308 may be similar or the same as the characteristics and functions of, respectively, power source 32, protection device 38, load 40, control unit 42, and power converter 35 of FIG. 1. In some examples, system 300 may be subject to a fault, such as line-to-line fault 305, which may result in fault current, $I_{FAULT}$ 26.

Power source 320 supplies power to electrical system 300 and HVDC grid 302, e.g. $I_{OUT}$ 310. Examples of power source 320 may include a battery, or similar energy storage element or another DC/DC converter.

Protection device 304 is a primary protection device of electrical system 300 and is implemented as an FMD in the example of FIG. 3.

Control unit 312 monitors the parameters and controls the components of electrical system 300. Control unit 112 may send and receive signals to and from power converter 108, protection device 104, and in some cases, AC power source 120 and HVDC grid 102. Control unit 312 may also connect to switch 340 via sense and control lines 314. Sense and control lines 314 may also connect to other sensors, e.g. temperature and voltage sensors, not shown in FIG. 3.

Power converter 308 converts power supplied by DC power source 320 to supply the requirements of HVDC grid 302. The example of power converter 108 is implemented as a boost DC/DC converter. However, in other examples, other types of DC/DC converters may also use the fault protection techniques of this disclosure. Power converter 308 includes switch 340, MOV 342 and filtering components inductor L2 334, diode D2 336 and capacitor C2 338. Inductor L2 334 connects the positive terminal of DC power source 320 to a first terminal of switch 340 and to the anode of diode D2 336. The cathode of diode D2 336 connects to protection device 304 and to capacitor C2 338. The opposite terminal of capacitor C2 338 connects to a second terminal of switch 340 and to the negative terminal of DC power source 320. In some examples the negative terminal of DC power source 320 may be considered a system ground.

Power converter 308 also includes MOV 342, which connects in parallel across switch 340. As with MOVs 140-152, described above in relation to FIG. 2B, MOV 342 is an energy absorption device associated with switch 340 that may limit the voltage across switch 340. In other examples a TVS diode may be used in place of MOV 342.

During normal operation, switch 340, in conjunction with inductor L2 334, diode D2 336 and capacitor C2 338 boosts the DC voltage output from DC power source 320 to a higher DC voltage, which is then output to HVDC grid 302. The magnitude of the increased DC voltage depends on the values of the capacitance of capacitor C2 338, inductance of inductor L2 334 and the switching characteristics (e.g. frequency, duty cycle, etc.) of switch 340 as controlled by control unit 312.

Similar to system 10 described above in relation to FIG. 1, during a fault condition control unit 312 may receive an indication of the fault condition. For example, control unit 312 may receive e.g., from a current sensor not shown in FIG. 3, an indication of a current level flowing out of power converter 308. Control unit 112 may determine that the current level represents a fault condition, e.g. fault 305 by determining the current level exceeds a predetermined acceptable current level associated with power converter 308 or HVDC grid 302.

In response to detecting fault 305, control unit 312 may reconfigure components of electrical system 300 to prevent fault 305 from damaging electrical system 300. In particular, control unit 312 may close switch 340 to reduce an amount of fault current $I_{FAULT}$ 26 associated with fault condition 305, for instance, prior to enabling protection device 304. In this way, a lower rated protection device 304 may be used, thereby reducing weight, cost, and complexity of electrical system 300.

To prevent damage from fault condition 305, control unit 312 may verify whether switch 340 is closed and conducting current. If switch 340 is not closed, control unit 312 may send a signal to close switch 340. Closing switch 340 may cause a portion of fault current 26 to recirculate back through DC power source 320, i.e. as $I_{RECIRC}$ 322, rather than exit power converter 35 towards protection device 38. In other words, by closing switch 340 some of the fault current may recirculate through DC power source 320 and reduce the magnitude of the remaining fault current flowing through protection device 304 as $I_{OUT}$ 310. Once control unit 312 enables protection device 304 and breaks the fault current, control unit 312 may signal switch 340 to open, which prevents the switch 340 from conducting the recirculating current, $I_{RECIRC}$ 322.

Figure 4:
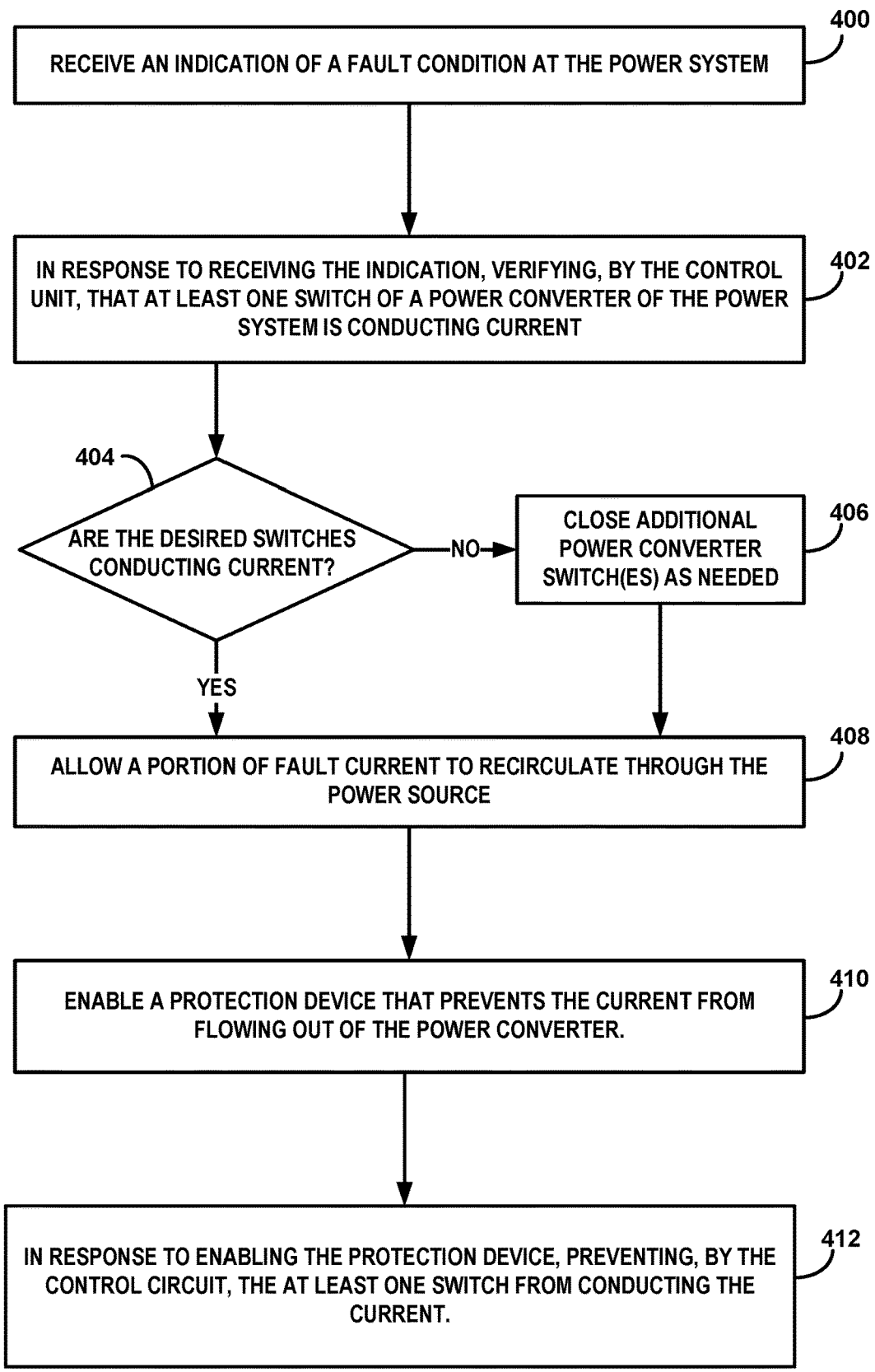
FIG. 4 is a flow chart illustrating example operations of an example electrical system configured to perform fault protection, in accordance with techniques of this disclosure.

FIG. 4 is a flow chart illustrating example operations of an example electrical system configured to perform fault protection, in accordance with techniques of this disclosure. The blocks of FIG. 4 will be described in terms of FIGS. 1 and 2B unless otherwise noted.

During normal operation (i.e., when no fault conditions, such as fault 20 exists) electrical system 10, depicted in FIG. 1 may convert power received from power source 32 and supply the converted power to load 40 via protection device 38. During a fault condition, control unit 42 may receive an indication of the fault condition at the power system, e.g. fault 20 (400). In some examples control unit 42 may detect an overcurrent condition at the output of power converter 35 caused by fault 20.

In response to detecting a fault, control unit 42 may verify that the at least one switch of switches 34 is closed and conducting current (402). The switches of switches 34 may open and close periodically during normal operation, as described above in relation to FIGS. 2B and 3.

In some examples control unit 42 may determine that one or more switches that should be conducting current during a fault condition are not already closed (NO branch of 404). If at least one switch that should be closed is not closed, control unit 42 may send a signal to close the switch (406). Closing the desired switches of the power converter allows a portion of the fault current to flow through the closed switches and recirculates through power source 32 as $I_{RECIRC}$ 22 (408). Similarly, as described above in relation to FIG. 2B, closing the desired switches may allow current to recirculate through AC power source 120 as currents $i_A$ 122, $i_B$ 124, and $i_C$ 126.

If the desired switches are already closed, (YES branch of 404), and allowing a portion of the fault current to recirculate back through power source 32 (408), may reduce the magnitude of the remaining fault current flowing through protection device 38 as $I_{OUT}$ 28.

After verifying that the at least one switch of switches 34 is conducting a portion of the fault current and allowing the portion of the fault current to recirculate through power source 32, control unit 42 may enable protection device 38 (410). In some examples, protection device 38 is an FMD. As described above in relation to FIG. 1, enabling protection device 38 may disconnect power converter 35 from load 40 and prevent the fault current from flowing from power converter 35. The reduced magnitude of remaining fault current through protection device 38 at the time control unit 42 enables may mean that protection device 38 does not need to be rated to absorb all the energy from the fault current when control unit 42 enables protection device 38. In some examples, enabling a protection device may be referred to as tripping the protection device. In some examples, switches 34 may also include an energy absorption device, such as MOV 140-152 depicted in FIG. 2B. An MOV or TVS diode may absorb and/or dissipate remaining energy that may damage switches 34 during a fault condition.

Once control unit 42 enables protection device 38 and breaks the fault current, control unit 42 may open all the switches in switches 34 (412). With all switches in switches 34 open, current is prevented from flowing from power converter 35 to load 40. Control unit 42 may keep switches 34 open until the cause of fault 20 is resolved.

In one or more examples, the functions described above may be implemented in hardware, software, firmware, or any combination thereof. For example, control unit 42 in FIG. 1 may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media, may comprise RAM, ROM, EEPROM, or any other medium that can be used to store desired program code in the form of instructions or data structures and that can be accessed by a computer. Also, any connection is properly termed a computer-readable medium. For example, if instructions are transmitted from a website, server, testing equipment or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry, as described above in relation to FIG. 1. Accordingly, the term "processor," as used herein, such as a processor included in control unit 42, may refer to any of the foregoing structure or any other structure suitable for implementation of the techniques described herein. In addition, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

The techniques of this disclosure may also be described in the following examples.

Example 1

A method comprising: receiving, by a control unit of a power system, an indication of a fault condition at the power system; in response to receiving the indication, verifying, by the control unit, that at least one switch of a power converter of the power system is conducting current; and after verifying that the at least one switch is conducting current, enabling, by the control unit, a protection device that prevents the current from flowing out of the power converter.

Example 2

The method of example 1, wherein the fault condition results in a fault current, wherein enabling the protection device comprises determining, by the control unit, whether the fault current is less than or equal to a predetermined current, wherein enabling the protection device is in response to the control unit determining that the fault current is less than or equal to the predetermined current.

Example 3

The method of any combination of examples 1-2, after verifying that the at least one switch is conducting, refraining, by the control unit, from enabling the protection device that prevents the current from flowing out of the power converter prior to determining that the fault current is less than or equal to the predetermined current.

Example 4

The method of any combination of examples 1-3, wherein the power converter comprises an alternating current (AC) power source and wherein, during the fault condition, a portion of the fault current recirculates through the AC power source.

Example 5

The method of any combination of examples 1-4, wherein the power converter comprises a direct current (DC) power source and wherein, during the fault condition, a portion of the fault current recirculates through the DC power source.

Example 6

The method of any combination of examples 1-5, wherein the power converter further comprises an energy absorption device associated with the at least one switch, wherein the energy absorption device limits a voltage across the at least one switch.

Example 7

The method of any combination of examples 1-6, further comprising, in response to enabling the protection device, preventing, by the control unit, the at least one switch from conducting the current.

Example 8

A control unit of an electrical system that includes a power converter comprising at least one switch configured to convert input power to an output power to a load, wherein the control unit is operatively coupled to the power converter and is configured to: receive an indication of a fault condition within the electrical system, wherein the fault condition causes a fault current in the power converter; in response to receiving the indication, verify that the at least one switch is conducting current; and after verifying that the at least one switch is conducting current, enable a protection device, wherein enabling the protection device prevents the fault current from flowing from the power converter and to the load.

Example 9

The control unit of example 8, wherein the control unit enables the protection device when the fault current is less than or equal to a predetermined current.

Example 10

The control unit of any combination of examples 8-9, wherein the power converter device is operatively coupled to an alternating current (AC) power source, the power converter device receives the input power from the AC power source; and the at least one switch is a low side switch; the device further comprising a high side switch operatively coupled to the AC power source, the high side switch and the low side switch configured to convert the input power to the output power; wherein the control unit is further configured to: in response to receiving the indication, verify that the low side switch is turned on, and the high side switch is not conducting current, such that at least a portion of the fault current flows through the low side switch; and after enabling the protection device, preventing the low side switch from conducting current.

Example 11

The control unit of any combination of examples 8-10, wherein during the fault condition, a portion of the fault current recirculates through the AC power source.

Example 12

The control unit of any combination of examples 8-11, wherein the high side switch and the low side switch are selected from a group comprising at least one of: an insulated gate bipolar transistor (IGBT) or a metal-oxide-semiconductor field-effect transistor (MOSFET).

Example 13

The control unit of any combination of examples 8-12, wherein the power converter device is operatively coupled to a direct current (DC) power source; the power converter device receives the input power from the DC power source; and wherein, during the fault condition and before enabling the protection device, a portion of the fault current recirculates through the DC power source.

Example 14

The control unit of any combination of examples 8-13, wherein the control unit is further configured to, after enabling the protection device, preventing the at least one switch from conducting current.

Example 15

The control unit of any combination of examples 8-14, wherein the power converter device further comprises an energy absorption device associated with the at least one switch, wherein the energy absorption device limits a voltage across the at least one switch.

Example 16

The control unit of any combination of examples 8-15, wherein the protection device is a fast mechanical disconnect (FMD) device.

Example 17

The control unit of any combination of examples 8-16, wherein the fault condition is a line-to-line fault.

Example 18

A system comprising: a high voltage direct current (HVDC) grid; a power source; a protection device; a power converter configured to supply DC power to the HVDC grid, the power converter comprising: at least one switch configured to convert input power from the power source into DC power; and a control unit operatively coupled to the at least one switch, the control unit configured to: receive an indication of a fault condition within the system, wherein the fault condition causes a fault current in the power converter; in response to receiving the indication, verify that the at least one switch is conducting current, such that at least a portion of the fault current flows through the at least one switch; after verifying that the at least one switch is conducting current, enable the protection device, wherein enabling the protection device prevents the fault current from flowing from the power converter and to the HVDC grid.

Example 19

The system of example 18, wherein the power source is an alternating current (AC) power source; the at least one switch is a low side switch; the power converter further comprising a high side switch operatively coupled to the AC power source, the high side switch and the low side switch are configured to convert the input power to the DC power; wherein the control unit is further configured to: in response to receiving the indication, verify that at least one of the low side switch or the high side switch is conducting current such that at least a portion of the fault current flows through the low side switch or the high side switch and recirculates through the AC power source; after verifying that the low side switch is conducting current, enable the protection device; and after enabling the protection device, prevent the low side switch from conducting current.

Example 20

The system of any combination of examples 18-19, wherein the control unit is further configured to, in response to receiving the indication, verify that both the low side switch and the high side switch is conducting current such that at least a portion of the fault current flows through both the low side switch and the high side switch and recirculates through the AC power source.

Example 21

The system of any combination of examples 18-20, wherein the power source is a direct current (DC) power source, during the fault condition and before enabling the protection device, a portion of the fault current recirculates through the DC power source, and the control unit is further configured to, after enabling the protection device, turn off the at least one switch to prevent the at least one switch from conducting current.

Example 22

The system of any combination of examples 18-21, wherein the power converter further comprises an energy absorption device associated with the at least one switch, wherein the energy absorption device limits a voltage across the at least one switch, and the protection device is a fast mechanical disconnect (FMD) device.

Example 23

The system of any combination of examples 18-22, wherein the system is part of an aircraft or other type of manned or unmanned vehicle.

Various examples of the disclosure have been described. These and other examples are within the scope of the following claims.

The invention claimed is:

1. A method comprising:
receiving, by a control unit of a power system, an indication of a fault condition at the power system;
in response to receiving the indication, verifying, by the control unit, that at least one switch of a power converter of the power system is conducting current, wherein verifying that the at least one switch of the power converter of the power system is conducting current comprises:
determining the state of the signal controlling the gate of the at least one switch; and
receive signals from a current sensor in the path of the at least one switch; and
after verifying that the at least one switch is conducting current, enabling, by the control unit, a protection device that prevents the current from flowing out of the power converter.

2. The method of claim 1, wherein the fault condition results in a fault current, wherein enabling the protection device comprises determining, by the control unit, whether the fault current is less than or equal to a predetermined current, wherein enabling the protection device is in response to the control unit determining that the fault current is less than or equal to the predetermined current.

3. The method of claim 2, further comprising:
after verifying that the at least one switch is conducting, refraining, by the control unit, from enabling the protection device that prevents the current from flowing out of the power converter prior to determining that the fault current is less than or equal to the predetermined current.

4. The method of claim 1, wherein the power converter comprises an alternating current (AC) power source and wherein, during the fault condition, a portion of the fault current recirculates through the AC power source.

5. The method of claim 1, wherein the power converter comprises a direct current (DC) power source and wherein, during the fault condition, a portion of the fault current recirculates through the DC power source.

6. The method of claim 1, wherein the power converter further comprises an energy absorption device associated with the at least one switch, wherein the energy absorption device limits a voltage across the at least one switch.

7. The method of claim 1, further comprising, in response to enabling the protection device, preventing, by the control unit, the at least one switch from conducting the current.

8. A control unit of an electrical system that includes a power converter comprising at least one switch configured to convert input power to an output power to a load, wherein the control unit is operatively coupled to the power converter and is configured to:
receive an indication of a fault condition within the electrical system, wherein the fault condition causes a fault current in the power converter;
in response to receiving the indication, verify that the at least one switch is conducting current, wherein verifying that the at least one switch of the power converter of the power system is conducting current comprises:
determining the state of the signal controlling the gate of the at least one switch; and
receive signals from a current sensor in the path of the at least one switch; and
after verifying that the at least one switch is conducting current, enable a protection device, wherein enabling the protection device prevents the fault current from flowing from the power converter and to the load.

9. The control unit of claim 8, wherein the control unit enables the protection device when the fault current is less than or equal to a predetermined current.

10. The control unit of claim 8,
wherein:
the power converter device is operatively coupled to an alternating current (AC) power source, the power converter device receives the input power from the AC power source; and
the at least one switch is a low side switch;
the device further comprising a high side switch operatively coupled to the AC power source, the high side switch and the low side switch configured to convert the input power to the output power;
wherein the control unit is further configured to:
in response to receiving the indication, verify that the low side switch is turned on, and the high side switch is not conducting current, such that at least a portion of the fault current flows through the low side switch; and
after enabling the protection device, preventing the low side switch from conducting current.

11. The control unit of claim 10, wherein, during the fault condition, a portion of the fault current recirculates through the AC power source.

12. The control unit of claim 10, wherein the high side switch and the low side switch are selected from a group comprising at least one of: an insulated gate bipolar transistor (IGBT) or a metal-oxide-semiconductor field-effect transistor (MOSFET).

13. The control unit of claim 8,
wherein:
the power converter device is operatively coupled to a direct current (DC) power source;
the power converter device receives the input power from the DC power source; and
wherein, during the fault condition and before enabling the protection device, a portion of the fault current recirculates through the DC power source.

14. The control unit of claim 13, wherein, the control unit is further configured to, after enabling the protection device, preventing the at least one switch from conducting current.

15. The control unit of claim 8, wherein the power converter device further comprises an energy absorption device associated with the at least one switch, wherein the energy absorption device limits a voltage across the at least one switch.

16. The control unit of claim 8, wherein the protection device is a fast mechanical disconnect (FMD) device.

17. The control unit of claim 8, wherein the fault condition is a line-to-line fault.

18. A system comprising:
a high voltage direct current (HVDC) grid;
a power source;
a protection device;
a power converter configured to supply DC power to the HVDC grid, the power converter comprising:
at least one switch configured to convert input power from the power source into DC power; and
a control unit operatively coupled to the at least one switch, the control unit configured to:
receive an indication of a fault condition within the system, wherein the fault condition causes a fault current in the power converter;
in response to receiving the indication, verify that the at least one switch is conducting current, such that at least a portion of the fault current flows through the at least one switch, wherein verifying that the at least one switch of the power converter of the power system is conducting current comprises:
determining the state of the signal controlling the gate of the at least one switch; and
receive signals from a current sensor in the path of the at least one switch;
after verifying that the at least one switch is conducting current, enable the protection device, wherein enabling the protection device prevents the fault current from flowing from the power converter and to the HVDC grid.

19. The system of claim 18,
wherein:
the power source is an alternating current (AC) power source;
the at least one switch is a low side switch;
the power converter further comprising a high side switch operatively coupled to the AC power source, the high side switch and the low side switch are configured to convert the input power to the DC power;
wherein the control unit is further configured to:
in response to receiving the indication, verify that at least one of the low side switch or the high side switch is conducting current such that at least a portion of the fault current flows through the low side switch or the high side switch and recirculates through the AC power source;
after verifying that the low side switch is conducting current, enable the protection device; and
after enabling the protection device, prevent the low side switch from conducting current.

20. The system of claim 19, wherein the control unit is further configured to, in response to receiving the indication, verify that both the low side switch and the high side switch is conducting current such that at least a portion of the fault current flows through both the low side switch and the high side switch and recirculates through the AC power source.

21. The system of claim 18, wherein:
the power source is a direct current (DC) power source,
during the fault condition and before enabling the protection device, a portion of the fault current recirculates through the DC power source, and
the control unit is further configured to, after enabling the protection device, turn off the at least one switch to prevent the at least one switch from conducting current.

22. The system of claim 18, wherein:
the power converter further comprises an energy absorption device associated with the at least one switch, wherein the energy absorption device limits a voltage across the at least one switch, and
the protection device is a fast mechanical disconnect (FMD) device.

* * * * *